United States Patent
Whitfield et al.

(10) Patent No.: US 10,590,779 B2
(45) Date of Patent: Mar. 17, 2020

(54) DOUBLE WALL TURBINE GAS TURBINE ENGINE BLADE COOLING CONFIGURATION

(71) Applicant: United Technologies Corporation, Farmington, CT (US)

(72) Inventors: Christopher Whitfield, Manchester, CT (US); Carey Clum, East Hartford, CT (US); Dominic J. Mongillo, Jr., West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 86 days.

(21) Appl. No.: 15/832,491

(22) Filed: Dec. 5, 2017

(65) Prior Publication Data

US 2019/0169998 A1     Jun. 6, 2019

(51) Int. Cl.
| | |
|---|---|
| *F01D 5/18* | (2006.01) |
| *F02C 9/18* | (2006.01) |
| *F02C 3/04* | (2006.01) |

(52) U.S. Cl.
CPC ............... *F01D 5/187* (2013.01); *F02C 9/18* (2013.01); *F02C 3/04* (2013.01); *F05D 2220/32* (2013.01);
(Continued)

(58) Field of Classification Search
CPC combination set(s) only.
See application file for complete search history.

(56) References Cited

U.S. PATENT DOCUMENTS

| | | |
|---|---|---|
| 3,810,711 A | 5/1974 | Emmerson et al. |
| 4,529,358 A | 7/1985 | Papell |
| | (Continued) | |

FOREIGN PATENT DOCUMENTS

| | | |
|---|---|---|
| EP | 2949867 A1 | 12/2015 |
| EP | 2985417 A1 | 2/2016 |
| | (Continued) | |

OTHER PUBLICATIONS

European Search Report for European Application No. 18210564.3 dated Apr. 15, 2019.

*Primary Examiner* — Dwayne J White
*Assistant Examiner* — Maxime M Adjagbe
(74) *Attorney, Agent, or Firm* — Carlson, Gaskey & Olds, P.C.

(57) ABSTRACT

An airfoil includes pressure and suction side walls that extend in a chord-wise direction between leading and trailing edges. The pressure and suction side walls extend in a radial direction to provide an exterior airfoil surface. A core cooling passage is arranged between the pressure and suction walls in a thickness direction and extends radially toward a tip. A skin passage is arranged in one of the pressure and suction side walls to form a hot side wall and a cold side wall. The hot side wall defines a portion of the exterior airfoil surface and the cold side wall defines a portion of the core passage. The core passage and the skin passage are configured to have a same direction of fluid flow. A resupply hole fluidly interconnects the core and skin passages. A centerline of the resupply hole is arranged at an acute angle relative to the direction of fluid flow in the core passage and is configured to provide a low turbulence flow region in the skin passage.

17 Claims, 5 Drawing Sheets

(52) U.S. Cl.
CPC ...... *F05D 2240/35* (2013.01); *F05D 2250/11* (2013.01); *F05D 2250/13* (2013.01); *F05D 2250/14* (2013.01); *F05D 2250/185* (2013.01); *F05D 2260/201* (2013.01); *F05D 2260/202* (2013.01); *F05D 2260/204* (2013.01); *F05D 2260/2212* (2013.01)

(56) References Cited

U.S. PATENT DOCUMENTS

| | | | | |
|---|---|---|---|---|
| 5,498,133 | A * | 3/1996 | Lee | F01D 5/186 416/97 R |
| 5,690,473 | A | 11/1997 | Kercher | |
| 5,720,431 | A | 2/1998 | Sellers et al. | |
| 5,816,777 | A * | 10/1998 | Hall | F01D 5/189 416/97 R |
| 8,529,193 | B2 * | 9/2013 | Venkataramanan | F01D 5/186 415/115 |
| 2014/0116666 | A1 * | 5/2014 | Xu | F01D 9/065 165/169 |
| 2016/0076384 | A1 | 3/2016 | Snyder et al. | |

FOREIGN PATENT DOCUMENTS

| | | |
|---|---|---|
| EP | 3249160 A1 | 11/2017 |
| WO | 2013123012 A1 | 8/2013 |

\* cited by examiner

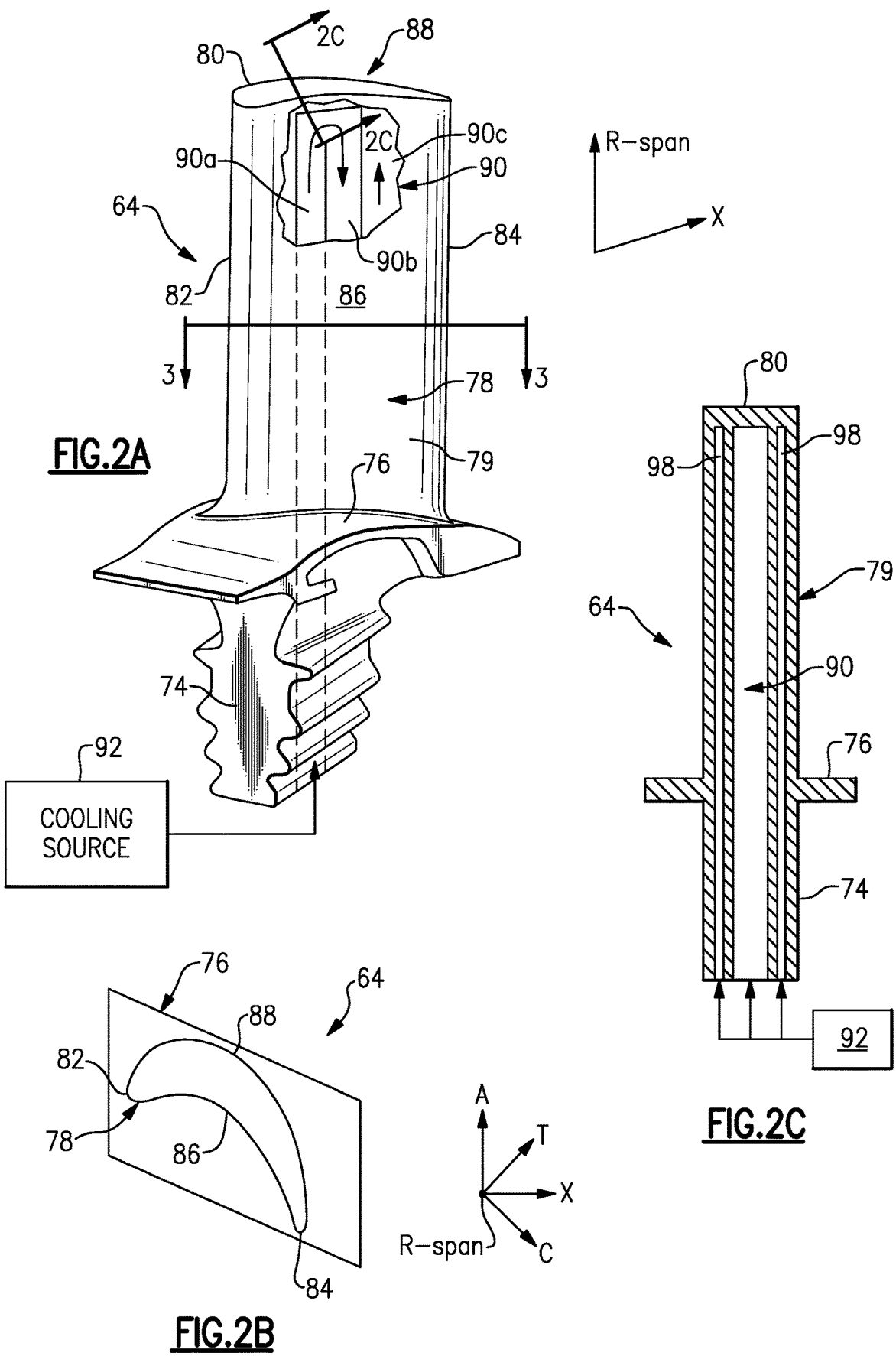

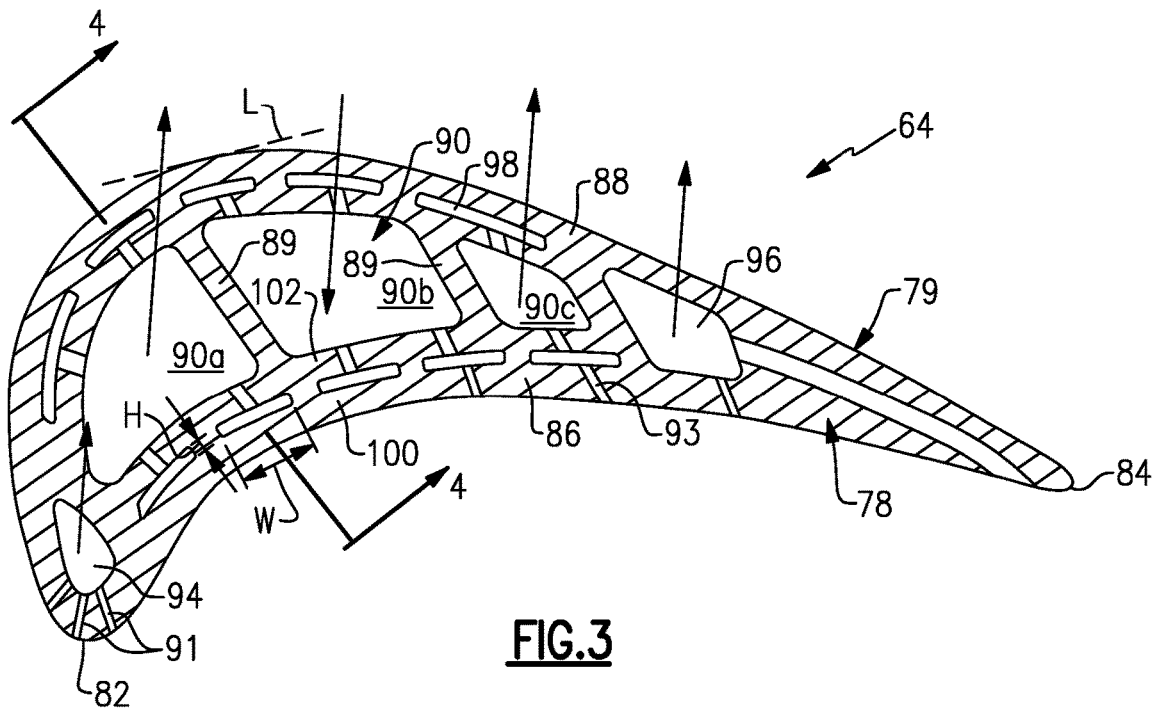

DOUBLE WALL TURBINE GAS TURBINE ENGINE BLADE COOLING CONFIGURATION

BACKGROUND

This disclosure relates to gas turbine engines and particularly to internally cooled rotor blades.

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

As is well known, the aircraft engine industry is experiencing a significant effort to improve the gas turbine engine's performance while simultaneously decreasing its weight. The ultimate goal has been to attain the optimum thrust-to-weight ratio. One of the primary areas of focus to achieve this goal is the "hot section" of the engine since it is well known that engine's thrust/weight ratio is significantly improved by increasing the temperature of the turbine gases. However, turbine gas temperature is limited by the metal temperature constraints of the engine's components. Significant effort has been made to achieve higher turbine operating temperatures by incorporating technological advances in the internal cooling of the turbine blades.

Serpentine core cooling passages have been used to cool turbine blades. The serpentine cooling passage is arranged between the leading and trailing edge core cooling passages in a chord-wise direction. One typical serpentine configuration provides "up" passages arranged near the leading and trailing edges fluidly joined by a "down" passage. This type of cooling configuration may have inadequacies in some applications. To this end, a double wall cooling configuration has been used to improve turbine blade cooling.

In a double wall blade configuration, thin hybrid skin core cavity passages extend radially and are provided in a thickness direction between the core cooling passages and each of the pressure and suction side exterior airfoil surfaces. Double wall cooling has been used as a technology to improve the cooling effectiveness of a turbine blades, vanes, blade out air seals, combustor panels, or any other hot section component. Often, core support features are used to resupply air from a main body core, which creates the core passages, into the hybrid skin core cavity passages, which creates the skin passages.

With traditional double wall configurations, a cooling benefit is derived from passing coolant air from the internal radial flow and/or serpentine cavities through the "cold" wall via impingement (resupply) holes and impinging the flow on the "hot" wall. These core support (resupply) features are typically oriented perpendicular to the direction of flow in the hybrid skin core cooling cavities. These perpendicular core support (resupply) features induce local flow vortices which generate a significant amount of turbulent mixing to occur locally within the hybrid skin core cavity passage. Although the impingement flow field characteristics associated with the resupply holes may appear beneficial, they create local flow characteristics which are not advantageous from an internal cooling perspective. Adverse impacts due to disruptive impingement resupply features oriented perpendicular to the downstream streamwise flow direction with in the hybrid skin core cavity generate pressure and momentum mixing losses that mitigate the favorable convective cooling flow field characteristics. Potential improvements in the internal flow field cooling qualities are diminished due to the disruptive nature of the injection of high pressure and velocity resupply cooling air flow normal to main hybrid skin core cooling passage flow direction. The potential decrease in bulk fluid cooling temperature may be adversely impacted by the additional cooling air heat pickup incurred due to the high impingement heat transfer and subsequent heat removal from the exterior hot wall. In a purely convective hybrid skin core cooling channel passage the locally high impingement heat transfer generated by the resupply features oriented normal to the downstream cooling flow may produce large local metal temperature gradients that result in locally high thermal strain and subsequent thermal mechanical fatigue crack initiation and propagation failure mechanisms.

Improving the mixing characteristics of the two different flows through the incorporation of "in-line" or "angled" resupply orientation and unique geometric features can improve the overall convective cooling characteristics of the internal flow field and increase the thermal cooling effectiveness of resupplied hybrid skin core cooling cavity passages. The intent of this invention is improve the relative alignment of the resupply cooling flow with the downstream cooling flow within the hybrid skin core cooling channel passages. Additionally it is also desirable to introduce the resupply cooling flow at a mass and momentum flux ratio that is≥the mass and momentum flux of the downstream cooling flow within the hybrid skin core cooling channel passage immediately adjacent to the internal surface of the hot exterior airfoil wall. By introducing resupply flow through a diffused geometric feature the relative mass and momentum mixing of the two different flow streams is more easily controlled by modifying the expansion ratio and geometry shape of the diffusing section of the resupply geometry.

SUMMARY

In one exemplary embodiment, an airfoil includes pressure and suction side walls that extend in a chord-wise direction between leading and trailing edges. The pressure and suction side walls extend in a radial direction to provide an exterior airfoil surface. A core cooling passage is arranged between the pressure and suction walls in a thickness direction and extends radially toward a tip. A skin passage is arranged in one of the pressure and suction side walls to form a hot side wall and a cold side wall. The hot side wall defines a portion of the exterior airfoil surface and the cold side wall defines a portion of the core passage. The core passage and the skin passage are configured to have a same direction of fluid flow. A resupply hole fluidly interconnects the core and skin passages. A centerline of the resupply hole is arranged at an acute angle relative to the direction of fluid flow in the core passage and is configured to provide a low turbulence flow region in the skin passage.

In a further embodiment of any of the above, the angle is in a range of 5°-45°.

In a further embodiment of any of the above, the skin passage has an aspect ratio that may vary between 3:1≥H/W≥1:5. H corresponds to a passage height and W corresponds to a passage width.

In a further embodiment of any of the above, the passage height (H) is in a range of 0.010-0.200 inches (0.25-5.08 mm).

In a further embodiment of any of the above, the resupply hole has an exit at the skin passage. The exit has a diffuser.

In a further embodiment of any of the above, serpentine cooling passage having first, second and third cooling passages. The first and third cooling passages have a direction of fluid flow toward the tip. The second cooling passage has a direction of fluid flow away from the tip. The core passage is provided by one of the first, second and third cooling passages.

In a further embodiment of any of the above, a film cooling hole extends from the skin passage to the exterior airfoil surface.

In a further embodiment of any of the above, the airfoil is a turbine blade.

In a further embodiment of any of the above, the resupply hole includes an exit at the skin passage. A cross-section of the resupply hole has a kidney shape with a concave side and a convex side joined by opposing curved sides. Cooling fluid is configured to flow out of the exit from the concave side toward the convex side.

In a further embodiment of any of the above, the resupply hole includes an exit at the skin passage. A cross-section of the resupply hole has an hourglass shape with a pair of concave sides joined by opposing curved sides. Cooling fluid is configured to flow out of the exit from one of the concave sides toward the other of the concave sides.

In a further embodiment of any of the above, the resupply hole includes an exit at the skin passage. A cross-section of the resupply hole has a kidney shape with a concave side and a flat side joined by opposing curved sides. Cooling fluid is configured to flow out of the exit from the concave side toward the flat side.

In a further embodiment of any of the above, the resupply hole includes an exit at the skin passage. A cross-section of the resupply hole has a tri-lobular shape with three concave sides joined by three curved sides. Cooling fluid is configured to flow out of the exit from one of the concave sides toward the one of the curved sides.

In a further embodiment of any of the above, the resupply hole includes an exit at the skin passage. A cross-section of the resupply hole has a triangular shape with three flat sides and three corners. Cooling fluid is configured to flow out of the exit from one of the three flat sides toward one of the three corners.

In a further embodiment of any of the above, the resupply hole includes an exit at the skin passage. A cross-section of the resupply hole has an oval shape with major and minor axes. Cooling fluid is configured to flow out of the exit along the minor axis.

In a further embodiment of any of the above, the resupply hole includes an exit at the skin passage. A cross-section of the resupply hole has a flat oval shape with a pair of flat sides joined by opposing curved sides. Cooling fluid is configured to flow out of the exit from one of the flat sides toward the other of the flat sides.

In a further embodiment of any of the above, the resupply hole includes an exit at the skin passage. A cross-section of the resupply hole has a crescent shape with a concave side and a convex side joined at opposing corners. Cooling fluid is configured to flow out of the exit from the concave side toward the convex side.

In a further embodiment of any of the above, the resupply hole includes an exit at the skin passage. A cross-section of the resupply hole has a crescent shape with a concave side and a convex side joined at opposing corners. Cooling fluid is configured to flow out of the exit from the convex side toward the concave side.

In a further embodiment of any of the above, the resupply hole includes an exit at the skin passage. A cross-section of the resupply hole has a kidney shape with a concave side and a convex side joined by opposing curved sides. Cooling fluid is configured to flow out of the exit from the convex side toward the concave side.

In a further embodiment of any of the above, the resupply hole includes an exit at the skin passage. A cross-section of the resupply hole has a diamond shape with four corners. Cooling fluid is configured to flow out of the exit from one of the four corners toward another of the four corners.

In another exemplary embodiment, a gas turbine engine includes a combustor section arranged fluidly between compressor and turbine sections. An airfoil is arranged in the turbine section. The airfoil includes pressure and suction side walls that extends in a chord-wise direction between leading and trailing edges. The pressure and suction side walls extend in a radial direction to provide an exterior airfoil surface. A core cooling passage is arranged between the pressure and suction walls in a thickness direction and extends radially toward a tip. A skin passage is arranged in one of the pressure and suction side walls to form a hot side wall and a cold side wall. The hot side wall defines a portion of the exterior airfoil surface. The cold side wall defines a portion of the core passage. The core passage and the skin passage are configured to receive a cooling fluid from the compressor section and have a same direction of fluid flow. A resupply hole fluidly interconnects the core and skin passages. A centerline of the resupply hole is arranged at an acute angle relative to the direction of fluid flow in the core passage and is configured to provide a laminar flow region in the skin passage. The angle is in a range of 5°-45°. The skin passage has an aspect ratio that may vary between $3:1 \geq H/W \geq 1:5$. H corresponds to a passage height and W corresponds to a passage width. The passage height (H) is in a range of 0.010-0.200 inches (0.25-5.08 mm).

BRIEF DESCRIPTION OF THE DRAWINGS

The disclosure can be further understood by reference to the following detailed description when considered in connection with the accompanying drawings wherein:

FIG. 2A is a perspective view of the airfoil having the disclosed cooling passage.

FIG. 2B is a plan view of the airfoil illustrating directional references.

FIG. 2C is a cross-sectional view taken along line 2C-2C of FIG. 2A.

FIG. 3 is a sectional view taken along line 3-3 of FIG. 2A.

FIG. 3A is a schematic view of a skin passage with a varying height and width along its length.

FIG. 4 depicts a portion of the core and skin passages and flow there-through.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
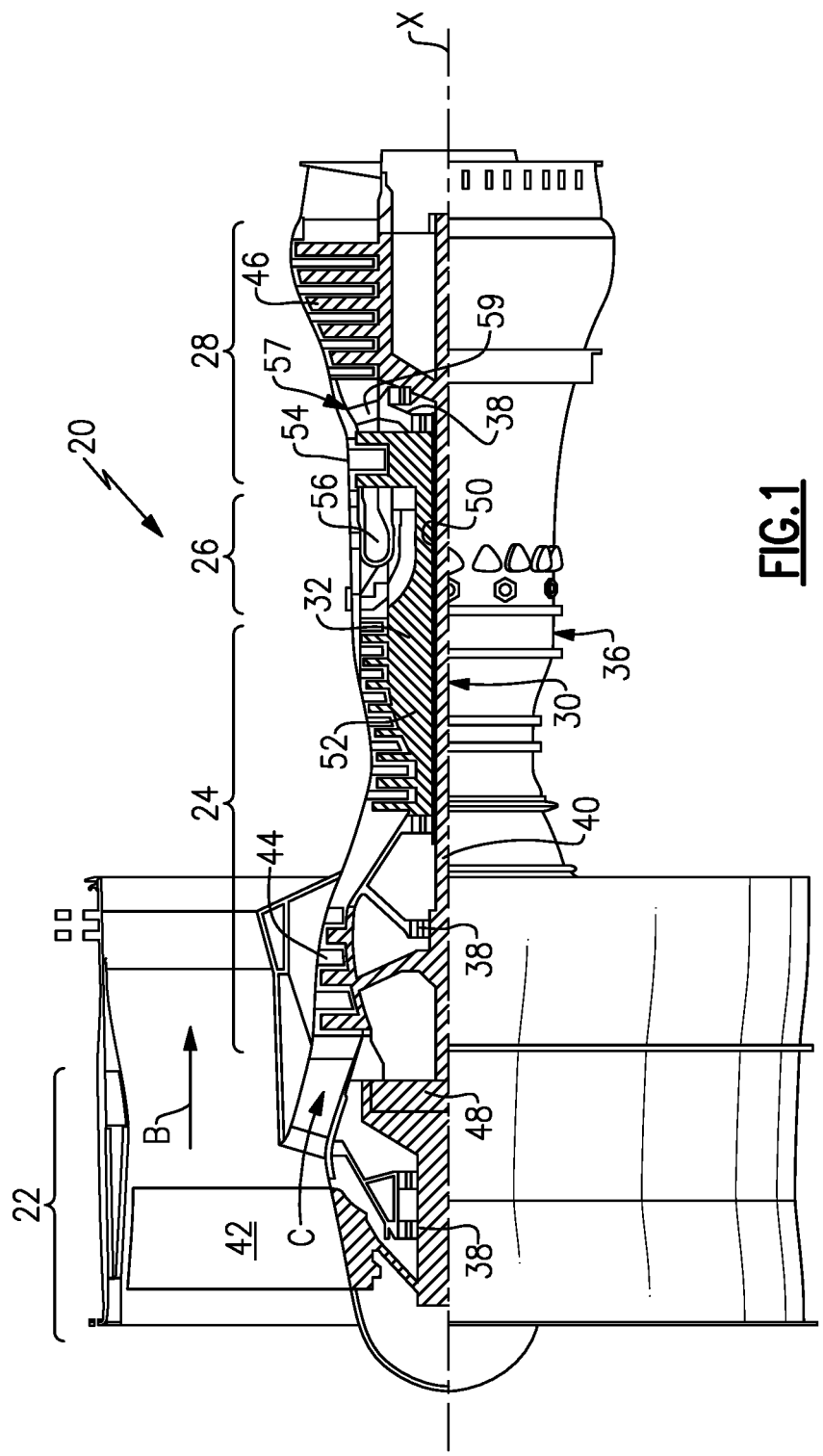
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis X which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

The disclosed cooling configuration is particularly beneficial for turbine blades of a gas turbine engine where internal cooling of the blades is desired, although the disclosed arrangement may also be used in the compressor section or for stator vanes. For exemplary purposes, a turbine blade 64 is described.

Referring to FIGS. 2A and 2B, a root 74 of each turbine blade 64 is mounted to a rotor disk. The turbine blade 64 includes a platform 76, which provides the inner flow path, supported by the root 74. An airfoil 78 extends in a radial direction R from the platform 76 to a tip 80. It should be understood that the turbine blades may be integrally formed with the rotor such that the roots are eliminated. In such a configuration, the platform is provided by the outer diameter of the rotor. The airfoil 78 provides leading and trailing edges 82, 84. The tip 80 is arranged adjacent to a blade outer air seal (not shown).

The airfoil 78 of FIG. 2B somewhat schematically illustrates an exterior airfoil surface 79 extending in a chord-wise direction C from a leading edge 82 to a trailing edge 84. The airfoil 78 is provided between pressure (typically concave) and suction (typically convex) walls 86, 88 in an airfoil thickness direction T, which is generally perpendicular to the chord-wise direction C. Multiple turbine blades 64 are arranged circumferentially in a circumferential direction A. The airfoil 78 extends from the platform 76 in the radial direction R, or spanwise, to the tip 80. The airfoil 78 includes a serpentine cooling passage 90 provided between the pressure and suction walls 86, 88. The disclosed skin core and resupply hole arrangement may be used with other cooling passage configurations, including non-serpentine cooling passage arrangements. As will be appreciated from the disclosure below, it should be understood that the central core passages from which resupply flow is bled might consist of a single radial core passage, and or multiple radial central core passages. Additionally one or more radial flow central core cooling passages may also be combined with a central core passage serpentine consisting of two or more continuous central cooling passages from which resupply flow may also be supplied.

Referring to FIG. 3, leading and trailing edge cooling passages 94, 96 are respectively provided near the leading and trailing edges 82, 84 as "up" passages refer to cooling passages that transport cooling fluid radially outward away from the engine centerline, in a direction towards a larger radial outboard location. Conversely, "down" passages, refer to cooling passages that transport cooling fluid radially inward toward the engine centerline, in a direction towards a smaller inboard location. The serpentine cooling passage 90 includes a first ("up") passage 90a near the leading edge cooling passage 94 that flows into a second ("down") passage 90b, which flows into a third ("up") passage 90c near the trailing edge cooling passage 96. The first, second and third passages 90a, 90b, 90c are separated by ribs 89. The serpentine cooling passage 90 and the leading and trailing edge cooling passages 94, 96 are referred to as "central main-body core" passages. The airfoil's mean camber line bisects the core passages in the example shown. The exterior airfoil surface 79 may include multiple film cooling holes 91, 93 in fluid communication with the cooling passages 90, 94, 96 to create a thin film boundary layer that protects the exterior airfoil 78 from hot gases in the core flow path C.

Referring to FIGS. 2A and 2C, a cooling source 92, such as bleed air from the compressor section 24, may be fluidly connected to the cooling passages 90, 94, 96 and hybrid skin core cavity cooling passages 98 to cool the blade 64.

As shown in FIGS. 2C and 3, the hybrid skin core cavity cooling passages 98 may be provided in the pressure and suction walls 86, 88, which separate these walls into a hot side wall 100 and a cold side wall 102. The hybrid skin core cavity cooling passages 98 typically have a much lower aspect ratio H/W, cavity height (H) to cavity width (W), than the "central main-body core" passages. Typically hybrid skin core cavity cooling passages have a cavity height (H) to cavity width (W) ratio that may vary in cavity aspect ratio between $3:1 \geq H/W \geq 1:5$ The height of the skin passage 98, which is generally in the thickness direction and typically normal to a tangent line L at the exterior airfoil surface 79, is in a range of 0.010-0.200 inches (0.25-5.08 mm).

FIG. 3A is a schematic view of a skin passage with a varying height and width along its length. A variation in hybrid skin core cooling cavity aspect ratio is schematically shown. The height H and/or width W can be varied along the length (i.e., $H1 \neq H2$ and/or $W1 \neq W2$ in the radial span-wise and chord-wise directions).

The hot side wall 100 provides the exterior airfoil surface 79 and an outer surface 104 of the hybrid skin core cooling cavity cooling passage 98. The cold side wall 102 provides an inner surface 106 of the hybrid skin core cavity cooling passage 98 and a central core cooling passage surface 108 of the central core cooling passage. The film cooling holes 93 may be fluidly connected to the hybrid skin core cavity cooling passages 98.

Referring to FIGS. 3 and 4, resupply holes 110 extend through the cold side wall 102 to fluidly interconnect the core passages, for example, serpentine passage 90, at an inlet 113 and an exit 114 of the hybrid skin core cavity cooling passages 98. In the past, the resupply holes 110 have been oriented in a direction normal to the central core cooling passages and the hybrid skin core cavity cooling passages 98, which typically generates pressure and momentum mixing losses due to the resupply jet velocities being introduced normal (perpendicular) to the downstream cooling flow in the hybrid skin core cavity cooling passage that mitigate the favorable convective cooling flow field characteristics. In this sense, the impingement jet emanating from the normally oriented resupply flow impedes and disrupts the flow vortices and convective heat transfer augmentation within the hybrid skin core cavity cooling passage along the rib roughened (turbulators/trip strip) internal surface of the exterior hot wall. Instead, the disclosed cooling configuration angles the resupply holes 110 in a favorable orientation more aligned with the flow direction of downstream fluid flow F within the hybrid skin core cavity cooling passage, which improves the mixing quality of the two separate cooling flow streams emanating from the resupply feed holes 110 and the cooling fluid within the hybrid skin core cavity cooling passage 98. It is also desirable to introduce the resupply cooling flow at a mass and momentum flux ratio that is ≥ the mass and momentum flux of the downstream cooling flow within the hybrid skin core cooling channel passage 98 immediately adjacent to the internal surface of the hot exterior airfoil wall. By introducing resupply flow through a geometric feature 110 comprising of a metering section 110a and a diffuser section 110b the relative mass and momentum mixing of the two different flow streams is more easily controlled by adjusting the expansion ratio of the diffuser section of the resupply hole geometry. Furthermore the expansion ratio of the resupply hole and diffuser geometry shape enables the control of both the magnitude and strength of the vortices within the flow region 112 being expelled into the hybrid skin core cavity cooling passage 98 downstream from the exit 114 of the resupply hole 110. In the example, the direction of fluid flow F is in the radial direction R and toward the tip 80. A centerline 116 of the resupply hole 110 has an acute angle G relative to the direction of fluid flow F in a range of 5°-45°.

The resupply holes 110 may have various shapes. One or more resupply holes 110 may be fluidly connected to each discrete skin passage 98. The exit 114 may provide a diffuser (right resupply hole 110 in FIG. 4), if desired.

Using techniques typically used in external film cooling, one may orient the core support resupply cooling features in the streamwise direction of the cooling air flow in the hybrid skin core cavity cooling passage. By improving the relative alignment of the two separate flow streams the momentum mixing associated with the differences in the inertial Coriolis and buoyancy forces between the two separate flow streams will be significantly reduced. In so doing the high pressure losses typically observed between the two independent flow streams emanating from a resupply hole 110 oriented normal to the downstream flow field within the hybrid skin core cavity cooling passage 98 can be significantly reduced and the resulting mixing length can be dissipated quickly along the streamwise direction of cooling flow within the hybrid skin core cavity cooling passage.

Additive manufacturing and Fugitive Core casting processes enable design flexibility in gas turbine manufacturing. One of the design spaces that additive opens up is in the design of ceramic cores used in the investment casting process. Traditional ceramic cores are made with a core die, which has a finite number of "pull planes." These pull planes restrict the design of ceramic cores to prevent features from overhanging in the direction that the die is pulled when the cores are removed. Additive manufacturing and Fugitive Core processes can remove those manufacturing restrictions, as dies are no longer required to create the ceramic cores of the internal cooling passages and internal convective cooling features, such as trip strips, pedestals, impingement ribs, resupply holes, etc.

An additive manufacturing process may be used to produce an airfoil. Alternatively, a core may be constructed using additive manufacturing and/or Fugitive Core manufacturing may be used to provide the correspondingly shaped resupply hole geometries when casting the airfoil. These advanced manufacturing techniques enable unique core features to be integrally formed and fabricated as part of the entire ceramic core body and then later cast using conventional loss wax investment casting processes. Alternatively, powdered metals suitable for aerospace airfoil applications may be used to fabricate airfoil cooling configurations and complex cooling configurations directly. The machine deposits multiple layers of powdered metal onto one another. The layers are joined to one another with reference to CAD data, which relates to a particular cross-section of the airfoil. In one example, the powdered metal may be melted using a direct metal laser sintering process or an electron-beam melting process. With the layers built upon one another and joined to one another cross-section by cross-section, an airfoil with the above-described geometries may be produced, as indicated at. The airfoil may be post-processed to provide desired structural characteristics. For example, the airfoil may be heated to reconfigure the joined layers into a single crystalline structure.

Figure 5:
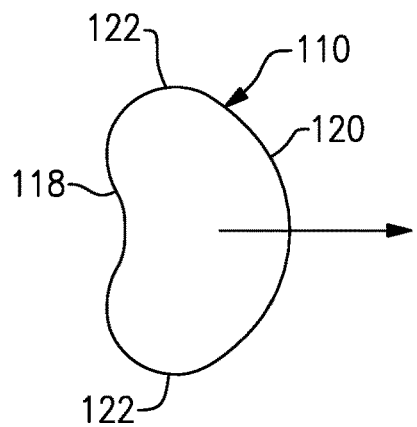
FIG. 5 is a schematic view of a kidney shaped resupply hole cross-section.
Figure 6:
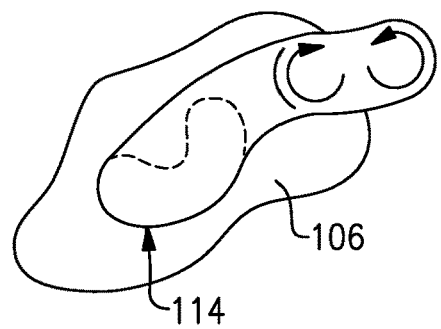
FIG. 6 is a schematic view of the cooling fluid flowing out of the cross-section shown in FIG. 5.

FIG. 5 illustrates an exit 114, and the resupply hole 110 has a kidney shaped cross-section formed by a concave side 118 and a convex side 120. The concave side 118 and the convex side 120 are joined by opposing curve sides 122. Coolant flow is configured to flow out of the exit 114 from the concave side 118 toward the convex side 120. The geometry of the exit 114 provides counter rotating vortices as shown in FIG. 6, which may be desirable in some airfoil cooling configurations.

Figure 7:
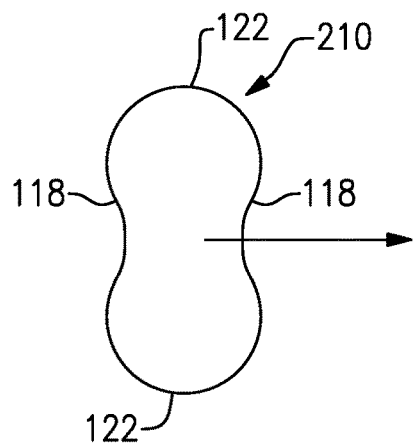
FIG. 7 is a schematic view of an hourglass shaped resupply hole cross-section.

Another exit 214 is shown in FIG. 7. The cross-section of the resupply hole 210 has an hourglass shape with a pair of concave sides 118 joined by opposing curve sides 122. Cooling fluid is configured to flow out of the exit from one of the concave sides 118 toward the other of the concave sides 118.

Figure 8:
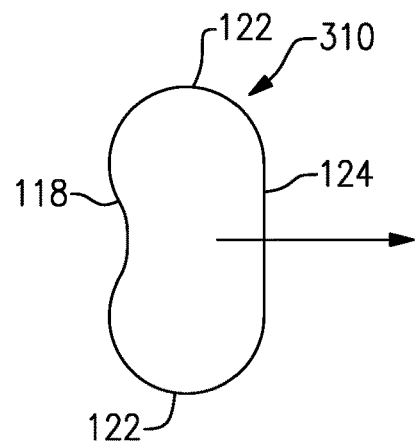
FIG. 8 is a schematic view of another kidney shaped resupply hole cross-section.

FIG. 8 illustrates another kidney shaped cross-section of the resupply hole 310. The resupply hole 310 includes a concave side 118 and a flat side 124 joined by opposing curve sides 122. The cooling fluid is configured to flow out of the exit from the concave side 118 toward the flat side 124.

Figure 9:
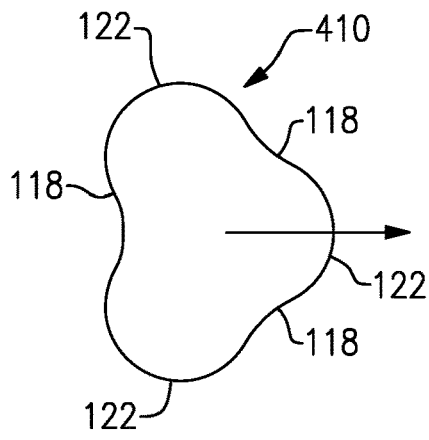
FIG. 9 is a schematic view of a tri-lobular shaped resupply hole cross-section.

The cross-section of the resupply hole 410 shown in FIG. 9 has a tri-lobular shape with three concave sides 118 joined by three curve sides 122. The cooling fluid is configured to flow out of the exit from one of the concave sides 118 toward one of the curve sides 122.

Figure 10:
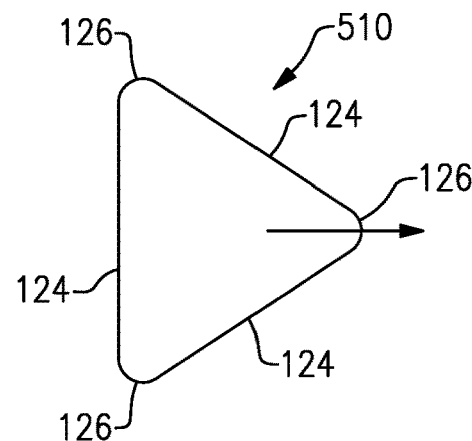
FIG. 10 is a schematic view of a triangular shaped resupply hole cross-section.

FIG. 10 illustrates a triangular shaped cross-section of the resupply hole 510 with three flat sides 124 joined by three corners 126. The cooling fluid is configured to flow out of the exit from one of the flat sides 124 toward one of the corners 126.

Figure 11:
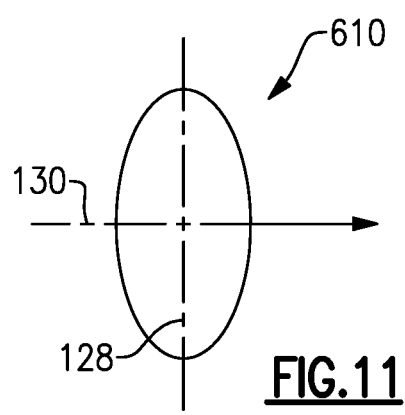
FIG. 11 is a schematic view of an oval shaped resupply hole cross-section.
Figure 12:
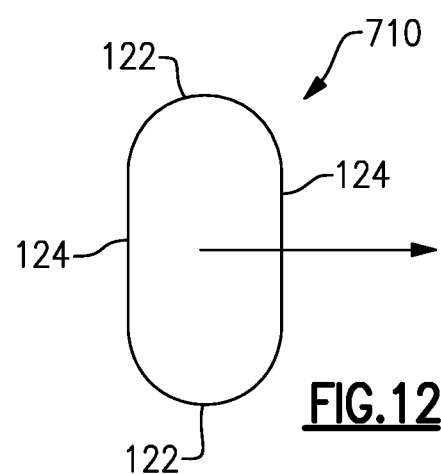
FIG. 12 is schematic view of a flat oval shaped resupply hole cross-section.

A cross-section of the resupply hole 610 has an oval shape with major and minor axes 128, 130, as shown in FIG. 11. The cooling fluid is configured to flow out of the exit along the minor axis 130. Another cross-section of the resupply hole 710 has a flat oval shape with a pair of flat sides 124 joined by opposing curve sides 122. The cooling fluid is configured to flow out of the exit from one of the flat sides 124 toward the other flat side 124.

Figure 13:
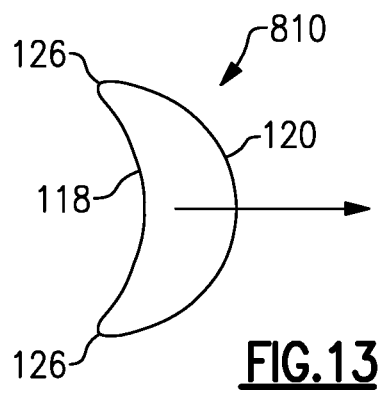
FIG. 13 is a schematic view of a crescent shaped resupply hole cross-section.
Figure 14:
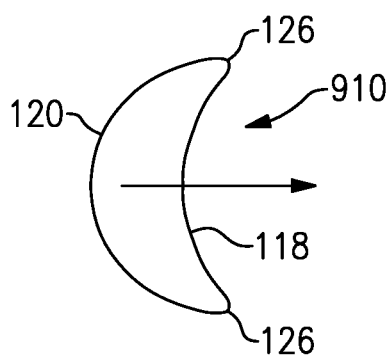
FIG. 14 is a schematic view of another crescent shaped resupply hole cross-section.

Crescent shaped cross-section of the resupply holes 810, 910 are illustrated in FIGS. 13 and 14. Each of the resupply holes 810, 910 include a concave side 118 and a convex side 120 joined at opposing corners 126. In the example shown in FIG. 13, the cooling fluid is configured to flow out of the exit from the concave side 118 toward the convex side 120. In the example shown in FIG. 14, the cooling fluid is configured to flow out of the exit from the convex side 120 toward the concave side 118.

Figure 15:
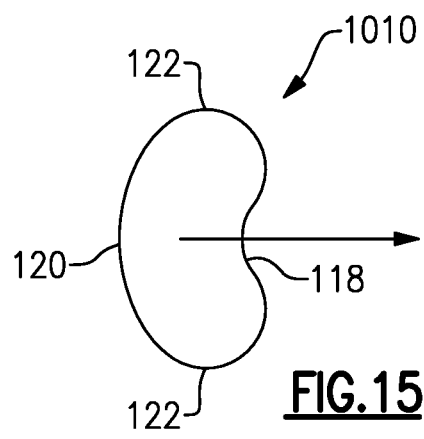
FIG. 15 is a schematic view of another kidney shaped resupply hole cross-section.

Another kidney shape cross-section of the resupply hole 1010 is shown in FIG. 15. The resupply hole 1010 has a concave side 118 and a convex side 120 joined by opposing curve sides 122. The cooling fluid is configured to flow out of the exit from the convex side 120 toward the concave side 118, which is the opposite of flow direction shown in FIG. 5.

Figure 16:
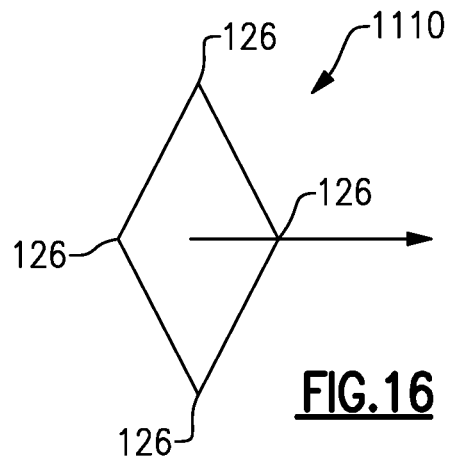
FIG. 16 is a schematic view of a diamond shaped resupply hole cross-section.

FIG. 16 illustrates a cross-section of the resupply hole 1110 that has a diamond shape with four corners 126. The cooling fluid is configured to flow out of the exit from one of the four corners 126 toward another corner 126.

The exit hole geometry as illustrated in FIGS. 5-16 are exemplary. The geometries are chosen to attain a desired flow characteristic and a boundary layer within the skin passage 98 based upon the desired pressure drop cooling and other characteristics for the airfoil in an application.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the embodiments of the present invention. Additionally it is important to note that any complex multi-facetted resupply geometries that bridge centrally located main body cooling passages and peripherally located hybrid skin core cooling cavity passages can be created at any number of radial, circumferential, and/or tangential locations within an internal cooling configuration. The quantity, size, orientation, and location will be dictated by the necessity to increase the local thermal cooling effectiveness and achieve the necessary thermal performance required to mitigate hot section part cooling airflow requirements, as well as, meet part and module level durability life, stage efficiency, module, and overall engine cycle performance and mission weight fuel burn requirements.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. An airfoil comprising:
pressure and suction side walls extending in a chord-wise direction between leading and trailing edges, the pressure and suction side walls extending in a radial direction to provide an exterior airfoil surface, a core cooling passage is arranged between the pressure and suction walls in a thickness direction and extends radially toward a tip, a skin passage is arranged in one of the pressure and suction side walls to form a hot side wall and a cold side wall, the hot side wall defines a portion of the exterior airfoil surface, and the cold side wall defines a portion of the core passage, the core passage and the skin passage are configured to have a same direction of fluid flow, and a resupply hole fluidly interconnects the core and skin passages, a centerline of the resupply hole is arranged at an acute angle relative to the direction of fluid flow in the core passage and is configured to provide a low turbulence flow region in the skin passage, wherein the angle is in a range of 5°-45°, the skin passage has an aspect ratio that varies between $3:1 \geq H/W \geq 1:5$, wherein H corresponds to a passage height and W corresponds to a passage width, the passage height (H) is in a range of 0.010-0.200 inches (0.25-5.08 mm).

2. The airfoil of claim 1, wherein the resupply hole has an exit at the skin passage, the exit has a diffuser.

3. The airfoil of claim 1, comprising serpentine cooling passage having first, second and third cooling passages, the first and third cooling passages having a direction of fluid flow toward the tip, and the second cooling passage having a direction of fluid flow away from the tip, the core passage provided by one of the first, second and third cooling passages.

4. The airfoil of claim 1, wherein a film cooling hole extends from the skin passage to the exterior airfoil surface.

5. The airfoil of claim 1, wherein the airfoil is a turbine blade.

6. The airfoil of claim 1, wherein the resupply hole includes an exit at the skin passage, a cross-section of the resupply hole has a kidney shape with a concave side and a convex side joined by opposing curved sides, and cooling fluid is configured to flow out of the exit from the concave side toward the convex side.

7. The airfoil of claim 1, wherein the resupply hole includes an exit at the skin passage, a cross-section of the resupply hole has an hourglass shape with a pair of concave sides joined by opposing curved sides, and cooling fluid is configured to flow out of the exit from one of the concave sides toward the other of the concave sides.

8. The airfoil of claim 1, wherein the resupply hole includes an exit at the skin passage, a cross-section of the resupply hole has a kidney shape with a concave side and a flat side joined by opposing curved sides, and cooling fluid is configured to flow out of the exit from the concave side toward the flat side.

9. The airfoil of claim 1, wherein the resupply hole includes an exit at the skin passage, a cross-section of the resupply hole has a tri-lobular shape with three concave sides joined by three curved sides, and cooling fluid is configured to flow out of the exit from one of the concave sides toward the one of the curved sides.

10. The airfoil of claim 1, wherein the resupply hole includes an exit at the skin passage, a cross-section of the resupply hole has a triangular shape with three flat sides and three corners, and cooling fluid is configured to flow out of the exit from one of the three flat sides toward one of the three corners.

11. The airfoil of claim 1, wherein the resupply hole includes an exit at the skin passage, a cross-section of the resupply hole has an oval shape with major and minor axes, and cooling fluid is configured to flow out of the exit along the minor axis.

12. The airfoil of claim 1, wherein the resupply hole includes an exit at the skin passage, a cross-section of the resupply hole has a flat oval shape with a pair of flat sides joined by opposing curved sides, and cooling fluid is configured to flow out of the exit from one of the flat sides toward the other of the flat sides.

13. The airfoil of claim 1, wherein the resupply hole includes an exit at the skin passage, a cross-section of the resupply hole has a crescent shape with a concave side and a convex side joined at opposing corners, and cooling fluid is configured to flow out of the exit from the concave side toward the convex side.

14. The airfoil of claim 1, wherein the resupply hole includes an exit at the skin passage, a cross-section of the resupply hole has a crescent shape with a concave side and a convex side joined at opposing corners, and cooling fluid is configured to flow out of the exit from the convex side toward the concave side.

15. The airfoil of claim 1, wherein the resupply hole includes an exit at the skin passage, a cross-section of the resupply hole has a kidney shape with a concave side and a convex side joined by opposing curved sides, and cooling fluid is configured to flow out of the exit from the convex side toward the concave side.

16. The airfoil of claim 1, wherein the resupply hole includes an exit at the skin passage, a cross-section of the resupply hole has a diamond shape with four corners, and cooling fluid is configured to flow out of the exit from one of the four corners toward another of the four corners.

17. A gas turbine engine comprising:
a combustor section arranged fluidly between compressor and turbine sections; and
an airfoil arranged in the turbine section, the airfoil including pressure and suction side walls extending in a chord-wise direction between leading and trailing edges, the pressure and suction side walls extending in a radial direction to provide an exterior airfoil surface, a core cooling passage is arranged between the pressure and suction walls in a thickness direction and extends radially toward a tip, a skin passage is arranged in one of the pressure and suction side walls to form a hot side wall and a cold side wall, the hot side wall defines a portion of the exterior airfoil surface, and the cold side wall defines a portion of the core passage, the core passage and the skin passage are configured to receive a cooling fluid from the compressor section and have a same direction of fluid flow, and a resupply hole fluidly interconnects the core and skin passages, a centerline of the resupply hole is arranged at an acute angle relative to the direction of fluid flow in the core passage and is configured to provide a laminar flow region in the skin passage, wherein the angle is in a range of 5°-45°, wherein the skin passage has an aspect ratio that varies between $3:1 \geq H/W \geq 1:5$, wherein H corresponds to a passage height and W corresponds to a passage width, wherein the passage height (H) is in a range of 0.010-0.200 inches (0.25-5.08 mm).

* * * * *